Aug. 8, 1967  C. W. MEHL  3,335,078
BIPOLAR CELL FOR ELECTROLYTICALLY TREATING WATER
Filed May 16, 1963  2 Sheets-Sheet 1
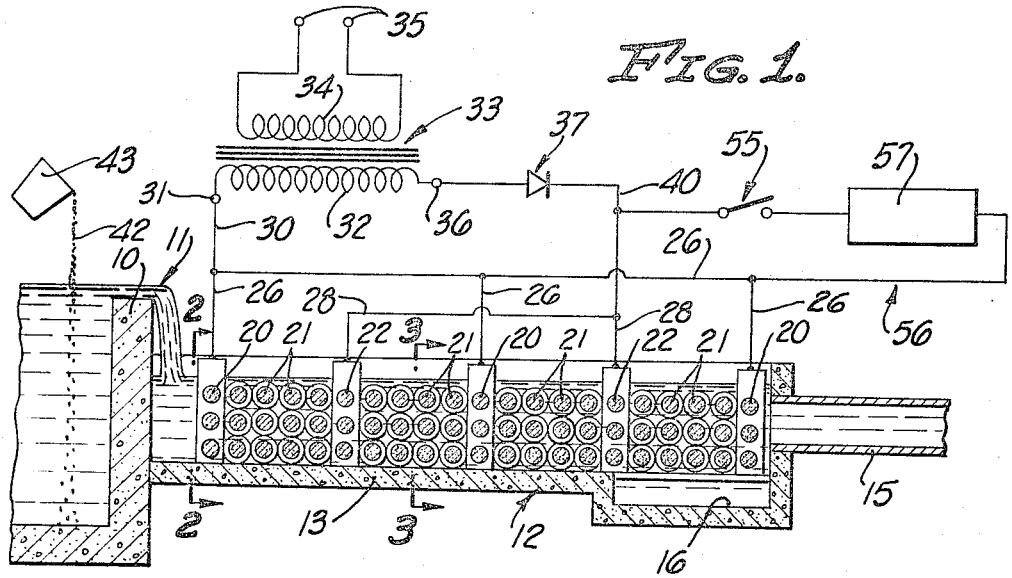
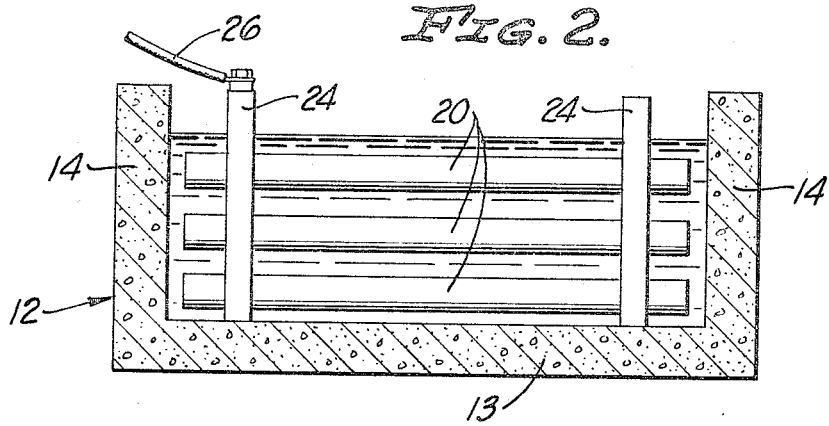
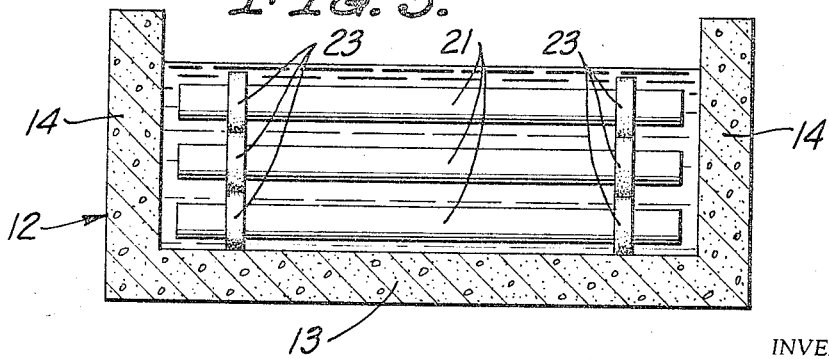
INVENTOR.
CHARLES W. MEHL
BY Herbert E. Kidder
AGENT Aug. 8, 1967  C. W. MEHL  3,335,078
BIPOLAR CELL FOR ELECTROLYTICALLY TREATING WATER
Filed May 16, 1963  2 Sheets-Sheet 2
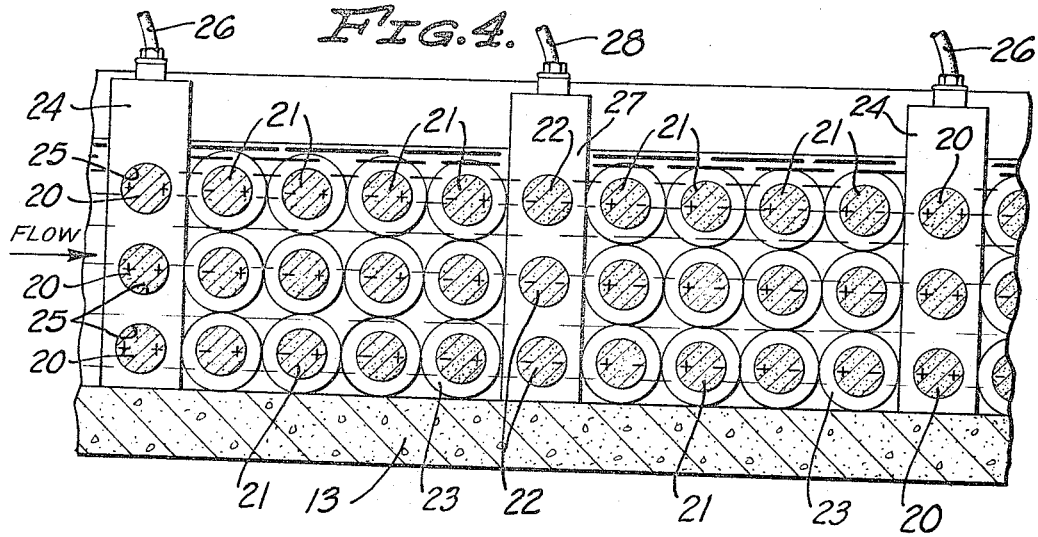
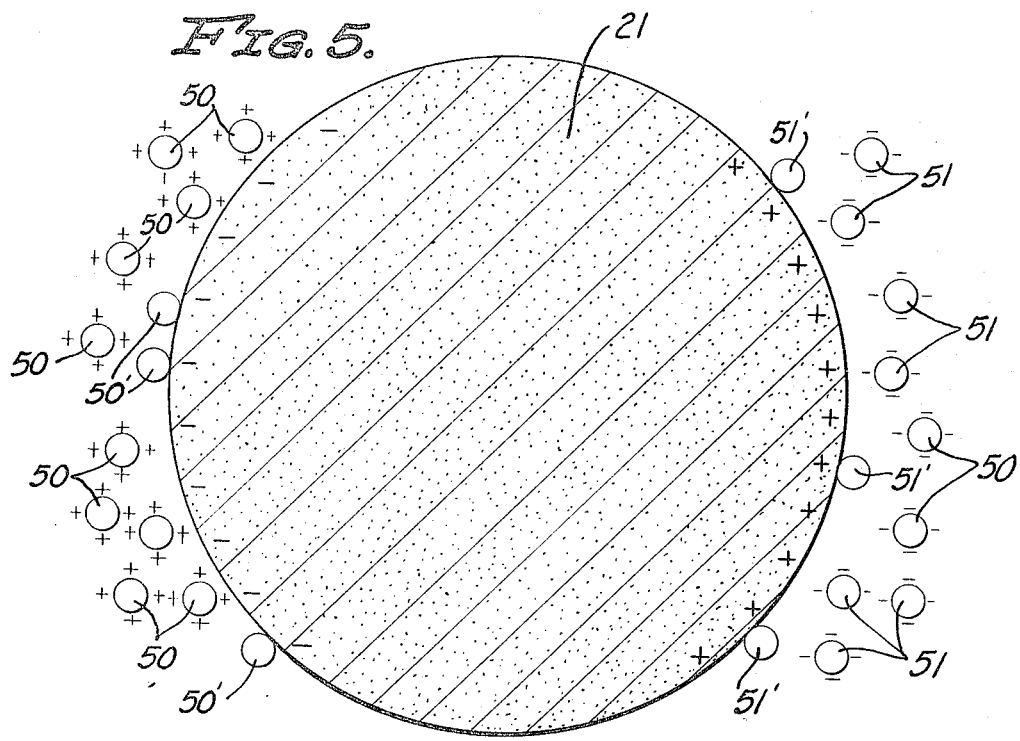
INVENTOR.
CHARLES W. MEHL
BY Herbert E. Fidder
AGENT united States Patent Office 3,335,078
Patented Aug. 8, 1967

3,335,078
BIPOLAR CELL FOR ELECTROLYTICALLY
TREATING WATER
Charles W. Mehl, Loma Linda, Calif., assignor, by mesne assignments, to Edward L. Hendey, Garland Casey and V. J. McAlpin, as tenants in common
Filed May 16, 1963, Ser. No. 280,978
1 Claim. (Cl. 204—268)

The present invention relates to a method and apparatus for electrolytically treating liquid containing certain dissolved or suspended matter, and the primary object of the invention is to provide a new and improved method and apparatus for flocculating substantially all colloidal matter contained therein, or alternatively, for electrolytically dissociating dissolved organic or inorganic matter some of which may tend to form an insoluble precipitate, while others may form gases that separate from the liquid or combine therewith to synthesize new chemical compounds.

These objects are achieved by means of a unique electrolytic apparatus, the operation of which is based upon Helmholtz' theory which states, in effect, that when a substance capable of existing in solution as ions is placed in water, a part of the substance passes into solution in the form of ions, thus leaving the remainder of the substance charged with an equivalent amount of electricity of opposite sign from that carried by the ions. This establishes a difference in potential between the substance in solution and the water, which is the solvent. The present invention provides a means for neutralizing the electrical charge on the substance, whereupon colloidal substances tend to flocculate and precipitate out, while dissolved solids are removed from solution in the form of gases or insoluble precipitate.

The present invention is particularly useful in connection with the treatment of sewage effluent discharged from the secondary digesters, at which point the sewage has been treated to remove most of the organic matter contained therein, and to break down most of the unstable substances into relatively stable compounds. Bacteria count is also reduced to an acceptable level to permit discharging the effluent into streams or settling basins. However, despite this treatment, the effluent usually contains a certain number of coliform bacteria, and also sufficient nutrient in the form of colloidal matter and dissolved solids to enable to coliform bacteria to grow and multiply. As a result, there is considerable objection to the use of sewage effluent for irrigation purposes, or to the discharge of such effluent into streams or onto grounds where it might contaminate the stream or the underground water supply. As the water shortage becomes increasingly more troublesome, it is evident that something must be done to further purify the effluent so as to completely kill off any remaining coliform bacteria, and render the water sterile, so that the effluent may be returned to the ground in a form that can be used.

A further object of the invention is to accomplish this electrolytic purification of the water in an inexpensive and economical manner. This is accomplished by utilizing a plurality of carbon electrodes which are immersed in the stream of water to be purified, and are arranged in a particular order and supplied with electrical current in a unique manner, whereby a maximum effectiveness of colloid removal, germ killing, and reduction of dissolved substances is obtained, with a minimum of electrical current consumption.

Another object of the invention is to provide an apparatus of the class described which generates nascent oxygen by electrolytic dissociation of the water, and nascent chlorine by electrolytic dissociation of sodium chloride, both of which gases act directly to kill bacteria in the water. The chlorine gas also combines with sodium hydroxide formed at the negatively charged areas of the electrodes, to produce sodium hypochlorite, which has a powerful bleaching and germicidal action. The sodium chloride from which the chlorine and sodium ions are derived may be present in the effluent to some extent, or it may be added to the effluent before the latter is treated. This generation of nascent oxygen and chlorine, and the formation of sodium hypochlorite makes the present invention particularly suitable for the treatment of water in swimming pools.

These and other objects and advantages of the invention will become apparent to those skilled in the art upon consideration of the following detailed description of the preferred embodiment thereof, reference being had to the accompanying drawings, wherein:

FIGURE 1 is a schematic view of a sewage treatment apparatus embodying the principles of the invention;
FIGURE 2 is an enlarged transverse sectional view of the same, taken at 2—2 in FIGURE 1;
FIGURE 3 is a similar view, taken at 3—3 in FIGURE 1;
FIGURE 4 is an enlarged fragmentary sectional view through a portion of the apparatus, showing the carbon dissociating electrodes arranged transverse to the direction of water flow, with certain of the electrodes connected to the electrical circuit, and intervening bipolar electrodes; and
FIGURE 5 is an enlarged cross-sectional view through one of the bipolar electrodes, showing schematically how the charged micelles of colloidal matter are attracted to the side of the electrode bearing a charge of opposite sign, where the micelles are electrically neutralized, or discharged, causing them to become inert and thus to precipitate out.

In the drawings, the reference numeral 10 designates a secondary digester, from which the effluent is discharged at 11 into a conduit 12, of concrete, tile, or other electrically nonconductive material. The conduit 12 is preferably in the form of an elongated, U-shaped channel having a bottom 13 and vertical sides 14. The channel 12 slopes gently away from the digester 10, so that the water flows along the length of the channel at a velocity giving a predetermined period of retention before the water is discharged through an outfall pipe 15. At the outlet end of the channel 12, the bottom 13 is recessed at 16 to form a pocket, and precipitate collects in this pocket for subsequent removal in any desired manner.

Disposed within the channel 13 and arranged generally transverse to the direction of water flow, is a plurality of carbon dissociating electrodes 20, 21 and 22. The electrodes 20, 21, 22 are preferably of graphite, in the form of cylindrical rods, and are illustratively shown in three levels, the rods of each level being vertically aligned with the rods above and/or below. The electrodes 20, 21, 22 are all parallel to one another, and are spaced fairly close together, so that the water passes over and around the electrodes as it flows from one end of the conduit to the other.

Electrodes 20 and 22 are connected to the electrical circuit, as will be described presently, but the intervening electrodes 21 are not connected to the circuit, nor is there any electrical connection between them. Electrodes 21 are known in the art as "bipolar" electrodes, since they carry a positive charge on one side and a negative charge on the other. There is a potential difference between adjacent bipolar electrodes 21 which is a function of the potential difference between electrodes 20, 22, and also of the ratio of the distance between adjacent electrodes 21 relative to the distance between electrodes 20, 22.

Electrodes 20 are separated from one another by means of rubber rings 23, which are passed over the ends of the electrodes and serve as spacers.

As best shown in FIGURE 4, the electrodes 20 and 22 are arranged in groups of three vertically aligned rods, although there may be any number in each group, depending upon the number of layers of electrodes in the conduit 12. If desired, alternate groups of electrodes may be turned at 90 degrees to the preceding and following electrodes so as to create turbulence in the water. The electrodes 20 of each group of three are joined together and supported by a pair of laterally spaced, vertical bars 24 of graphite, which stand on the bottom of the channel and rise above the surface of the water. The bars 24 are drilled at 25 to receive the electrodes 20, and by virtue of their direct carbon-to-carbon contact, the electrodes 20 and bars 24 are electrically connected together as one. The projecting top end of one of the bars 24 is connected to a wire 26, which is also connected to all of the other groups of electrodes 20.

The electrodes 22 in each group of three are likewise joined together and supported by a pair of laterally spaced, vertical bars 27 of graphite. One of which is connected to a wire 28 that is common to all of the groups of electrodes 22.

Wires 26 are connected by a wire 30 to one terminal 31 of the secondary winding 32 of a transformer 33. The primary winding 34 of the transformer is connected to a source 35 of alternating current. The other terminal 36 of the transformer secondary is connected to a diode rectifier 37, which is connected, in turn, to a wire 40. Wire 40 is connected to wire 26, which is electrically connected to the electrodes 22 in each of the two groups shown in FIGURE 1.

The current delivered by the transformer secondary winding 32 and diode rectifier 37 is half-wave rectified current. As such, it contains characteristics of both alternating current and direct current, and, in fact, has all the characteristics of superimposed A.C. and D.C. The direct current characteristic is that one pole is always positive, and the other always negative; while the pulsating nature of the half-wave rectified current gives it an alternating current characteristic. In FIGURE 4, the electrodes 20 are shown as carrying a positive charge, while electrodes 22 are negatively charged. The intervening bipolar electrodes 21 are negatively charged on the side facing toward the positively charged electrodes 20, and are positively charged on the side facing toward the negatively charged electrodes 22. Thus, in FIGURE 4, each bipolar electrode 21 is negative on its left-hand side and positive on its right-hand side.

The voltage output of the transformer secondary 32 is preferably adjusted so as to produce a potential difference of around 20 volts between any two adjacent bipolar electrodes 21. Since there are four vertical rows of bipolar electrodes 21 between each row of electrodes 20 and the adjacent row of electrodes 22, the distance between electrodes 20 and 22 is divided into five substantially equal increments, and therefore the voltage measured across electrodes 20 and 22 would be about 100 v. This can be varied somewhat, depending upon the amount of electrical energy required to purify the water, the conductivity of the water, the spacing between the electrodes, and other factors.

Under some conditions, the water may not contain sufficient sodium chloride or other electrolyte to have enough conductivity for the purposes of the invention. In this case, sodium chloride 42 may be added to the water in the secondary digester 10 by pouring from a container 43.

As the water to be treated flows along the conduit 12, it passes between and around the electrodes 20, 21, 22, and contacts all sides thereof. Various substances in solution or suspended in the water are exposed to the negative charge on the left-hand side of the bipolar electrodes 21, and to the positive charge on the right-hand side thereof. Each individual particle of colloidal matter, known as a micelle, carries a surface charge of electricity, which causes the micelles to move toward an electrode of opposite charge, just as ions of an electrolyte in solution are attracted to an electrode of opposite charge during electrolysis. These charges are borne on the particle surface, and can result from adsorbed ions that have been taken from the surrounding water, or from charged atoms or groups of atoms that are an integral part of the chemical structure of the particle. Micelles of colloidal matter bearing a positive charge, which are designated by the reference numeral 50, are attracted to the negatively charged, left-hand side of the electrode 21, and upon making contact therewith, are electrically discharged, or neutralized. Upon losing their electrical charge, the micelles become inert, and drop to the bottom of the channel as a floc. A number of such discharged micelles are designated at 50'. The micelles shown in FIGURE 5 are, of course, greatly exaggerated in size for the purpose of illustration.

Negatively charged micelles 51 are attracted to the positively charged, right-hand side of the electrode 21, and upon making contact therewith, are electrically discharged, or neutralized. Such discharged micelles are shown at 51'.

At the same time, some of the water is electrically dissociated to form nascent hydrogen on the negatively charged sides of the electrode, and nascent oxygen on the positively charged sides. The nascent oxygen, in particular, has a strong bleaching and germicidal action.

Simultaneously, sodium chloride in solution is dissociated to release sodium ions at the negatively charged sides of the electrodes, and chlorine ions at the positively charged sides. The sodium ions combine with the hydroxyl ions to form sodium hydroxide, which combines, in turn, with chlorine, to form sodium hypochlorite. Both nascent chlorine and sodium hypochlorite have a powerful bleaching and bactericidal action, which kills off any coliform bacteria in the water.

In addition to the bactericidal action of the nascent oxygen, chlorine, and sodium hypochlorite produced by the electrodes, there is also a bacteria-killing action which is apparently due to the nature of the electrical current supplied to the electrodes. This peculiar and unexpected phenomenon is clearly established by the results obtained with the above-described half-wave rectified current, as compared with the results obtained with straight direct current. The exact reason for this bacteria-killing action of the half-wave rectified current is not clearly understood at this time, but repeated laboratory tests of samples of sewage water treated in the apparatus of the present invention confirm it to be a fact.

Dissolved inorganic solids and detergent (ABS) are removed from the water in the form of an insoluble precipitate which forms on the top surfaces of the electrodes. This precipitate may be brushed off periodically, so that it falls to the bottom of the channel, to be carried along by the current until it drops into the recess 16. The precipitate may also be dislodged by periodically discharging the electrical charge which accumulates on the electrodes after the unit has been in operation for a certain period of time. The total amount of electrical charge built up in any given period of time depends upon the number of electrodes and the surface area thereof, the volume of flow, the organic and inorganic content of the water, and various other factors. In a small experimental unit treating sewage effluent, I have measured a discharge current flow of 10 amps at 10 volts, for a 10 minute period of time, after the unit has been in operation for only one hour. The accumulated charge is preferably discharged by disconnecting the transformer primary 34 from the source of current 35, and closing a switch 55, which connects the electrodes 20 and 22 to an auxiliary circuit 56. This auxiliary circuit 56 may include an electrolytic cell 57 for producing sodium hypochlorite and nascent oxygen and chlorine from a solution of sodium chloride, to be added to the sewage effluent during the time that the primary unit is shut down. Any other form of electrical load, such as electric lights, could be substituted for the electrolytic cell 57.

Tests made of water treated by the apparatus of my invention show complete elimination of coliform bacteria, and a great reduction in total dissolved solids (TDS), biological oxygen demand (BOD), and alkyl benzyl sulfonate (ABS). Sewage effluent thus treated is suitable for return to streams, or for irrigation. The cost of treating the water is extremely low, and the initial cost of the apparatus is likewise modest because of the simplicity of the apparatus.

One of the chief advantages of the present invention is its low cost of operation due to the high efficiency with which electrical current is used to purify water, remove colloidal matter therefrom, and to remove dissolved solids by forming insoluble precipitates of the same, or by synthesizing new compounds which are useful in themselves. The large number of bipolar dissociating electrodes with their anode-cathode surfaces, present a large area of electrical activity with a relatively low potential difference between adjacent electrodes. Another factor contributing to the efficiency of the invention in purifying sewage effluent, is the fact that the nascent oxygen and chlorine produced by electrolysis is lower in cost than an equivalent amount of bleaching and sterilizing chemical purchased in the market and added to the water, and is also more active than manufactured compounds because of the immediate atomic action and molecular dispersion.

In considering the application of the invention to a particular sewage treatment installation, the first step is to determine (1) the volume of water to be treated; (2) the total amount of dissolved solids in the water (TDS); and (3) the purity of the water, pH, and bacterial values needed after treatment. Using these factors, the amount of electrical current needed may be computed from Faraday's law regarding electrolysis, which states that the amount of dissolved salts set free at the electrodes is directly proportional to the amount of electricity passing through the solution, and the same amount of electricity liberates quantities of substances which are proportional to their chemical equivalent weights. The additional current required to neutralize or discharge the colloid micelles is negligible compared to the current required for electrolysis of dissolved salts, and may be disregarded.

The electrical resistance of the water during treatment determines the number of dissociating electrodes 20, 21 and 22 needed to obtain a suitable voltage potential. Fewer dissociating electrodes are used if the resistance is high. Resistance may also be reduced by adding more salt to the water.

Retention time is determined by the finished product desired. Greater retention time gives more complete removal of TDS, BOD and ABS. These factors are determined in a small test unit, and the results are extrapolated to give: (1) the rate of flow of water through the channel 12; (2) the length of channel 12 to give the desired retention time; and (3) the number of electrodes to give the desired current flow.

While I have shown and described in considerable detail what I believe to be the preferred form of my invention, it will be understood by those skilled in the art that various changes may be made in the shape and arrangement of the several parts without departing from the broad scope of the invention as defined in the following claim.

I claim:

Apparatus for electrolytic treatment of fluid comprising:
conduit means for carrying a stream of said fluid to be treated;
a plurality of parallel carbon dissociating electrodes disposed within said conduit means and arranged generally transverse to the direction of flow of said fluid, said electrodes being immersed in said fluid and spaced apart equidistantly from one another along the direction of flow;
a source of rectified half-wave electrical current.
means connecting said source of rectified half-wave electrical current to certain of said electrodes which are spaced apart from one another with a number of intervening bipolar electrodes disposed therebetween, said bipolar electrodes being electrically connected to said source of rectified current solely through the water in which the electrodes are immersed;
each of said bipolar electrodes having a positive charge on one side thereof and a negative charge on the other side, the potential difference between adjacent pairs of electrodes corresponding approximately to the total voltage at said source of rectified electrical current divided by the number of said bipolar electrodes plus one;
an auxiliary circuit including an electrolytic cell containing a solution of sodium chloride; and
switch means connecting said auxiliary circuit to said electrodes, whereby said electrodes may be periodically discharged through said electrolytic cell while said source of rectified half-wave current is disconnected therefrom, so as to produce sodium hypochlorite, nascent oxygen, and nascent chlorine, which is added to said fluid during treatment thereof.

References Cited

UNITED STATES PATENTS

| | | | |
|---|---|---|---|
| 831,434 | 9/1906 | Hinkson | 204—149 |
| 943,187 | 12/1909 | Hartman | 204—149 |
| 961,924 | 6/1910 | Wohlwill | 304—109 |
| 1,070,454 | 8/1913 | Griswold | 204—254 |
| 1,095,893 | 5/1914 | Landreth | 204—149 |
| 1,146,942 | 7/1915 | Landreth | 204—149 |
| 1,312,756 | 8/1919 | Stover | 204—268 |
| 1,428,050 | 9/1922 | Nickum | 204—149 |
| 1,746,964 | 2/1930 | Polatsick | 204—149 |
| 2,036,949 | 4/1936 | Meinzer | 204—242 |
| 2,046,467 | 7/1936 | Krause | 204—149 |
| 2,864,750 | 12/1958 | Hughes et al. | 204—149 |
| 3,192,146 | 6/1965 | Vellas et al. | 204—149 |

HOWARD S. WILLIAMS, *Primary Examiner.*

JOHN H. MACK, *Examiner.*

T. H. TUNG, *Assistant Examiner.*